Figure 1:
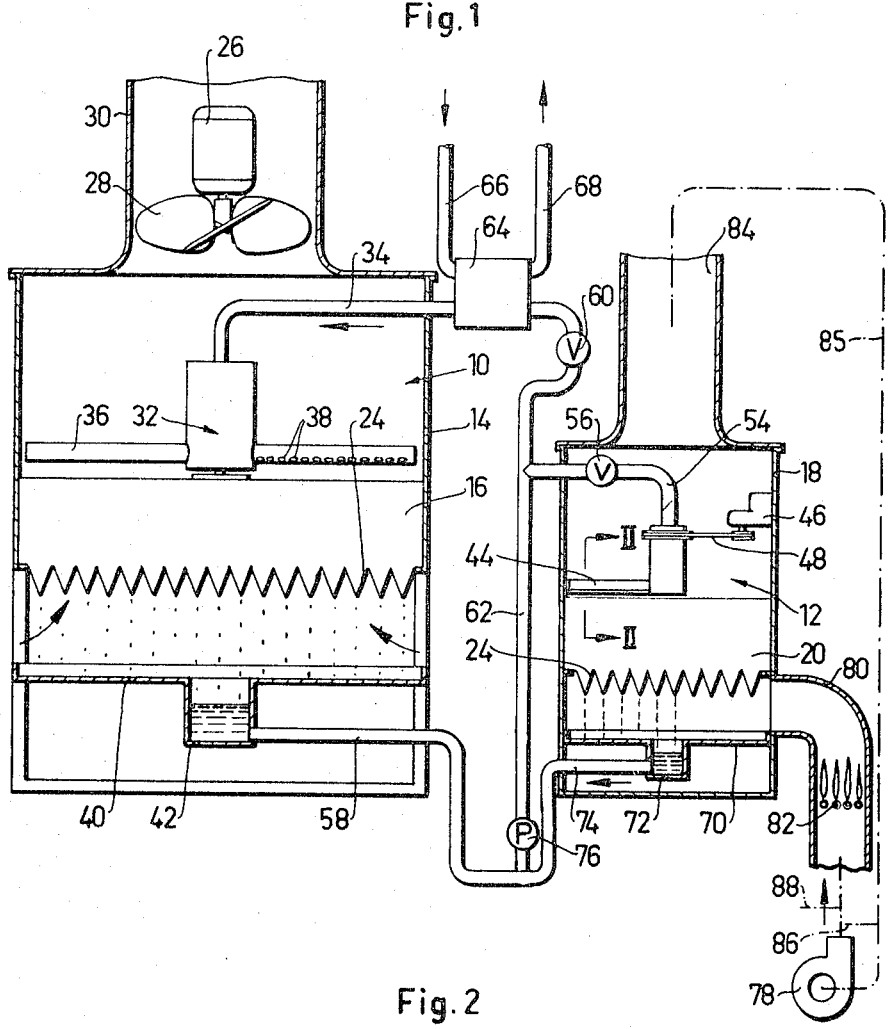

INVENTOR
CARL GEORG MUNTERS

INVENTOR
CARL GEORG MUNTERS
BY
Eric Y. Munson
ATTY.

United States Patent Office 3,266,553
Patented August 16, 1966

3,266,553
METHOD AND APPARATUS FOR EVAPORATING A COMPONENT FROM A LIQUID CONTAINING SEVERAL COMPONENTS
Carl Georg Munters, 3 Danderydsvagen, Stocksund, Sweden
Filed Jan. 4, 1965, Ser. No. 425,674
Claims priority, application Sweden, Dec. 23, 1959, 12,174/59
2 Claims. (Cl. 159—4)

This is a continuation-in-part application of my application Serial No. 77,213 filed December 20, 1960, now abandoned.

This invention relates to a system of absorbing moisture from a gas by circulating a liquid solution containing a hygroscoping component in evaporative contact with the gas, and more particularly to a method and apparatus for restoring to or regenerating the resultant diluted solution to the desired hygroscopic capacity.

In particular this invention relates to air conditioning and will be described in connection with such use in the following specification, although the invention is not confined thereto.

It is known in prior art to use an absorptive liquid consisting of water and a hygroscopic component such as a salt dissolved therein. By air conditioning is to be understood that the air is subjected to a drying process, possibly in combination with a change of temperature, such as cooling. The absorptive solution, in which the salt may be lithium bromide or chloride, picks up moisture from the air to be conditioned, and must be regenerated in order to regain its absorptive capacity.

It is herefore known to heat the absorptive solution in an evaporative apparatus or regenerator to such a high temperature as to cause water to be evaporated. It has also been proposed to bring the solution into contact with a flow of hot air which drives off water from the solution. The regenerated absorptive solution leaves the regenerator in a hot condition, and thus contains some energy which represents a loss per se, for which reason it has been proposed to effect a recovery of said energy by heat exchange with untreated solution entering the regenerator. Another way to keep the heat loss down is to have a minimum quantity of the absorptive solution passing through the regenerating circuit. This method, however, has drawbacks. As the amount of moisture, which the solution has absorbed and which therefore must be removed, is given in each case, operation with a small quantity of liquid results in low salt concentration upon its introduction into the regenerator. It will be appreciated that when the air to be dried is affected by a brine thus diluted, the drying process cannot be carried as far as with solutions having higher concentrations. Again, if a compensation is made for the small circulating quantity of the absorptive solution by its regeneration to a high salt concentration, a limit will soon be reached where the salt is precipitated in the form of crystals. Thus this expedient has a narrow application because of the risk of salt crystal deposits in the regenerator or in the conduits and thus blocking the free passage therethrough.

Among the objects of the invention is to provide a novel and effective method and apparatus for regenerating the hygroscopic properties of the liquid solution by circulating a portion of the diluted liquid stream through an absorptive element in a continuous circuit to and from the main stream.

Another object is to subject the diverted liquid stream to rapid evaporation by contact with a heated gas stream in an absorptive element having a plurality of passages, the surfaces of which are adapted to be wetted by and retain deposits of the liquid solution and then flush successively a restricted area of the absorptive element to remove the deposits therefrom.

Still a further object of the invention is to avoid undue heating of the regenerating stream.

Figure 2:
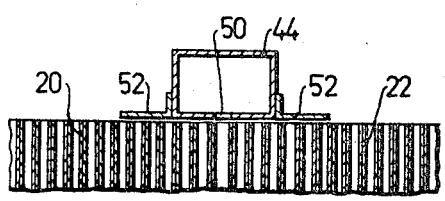
Figure 3:
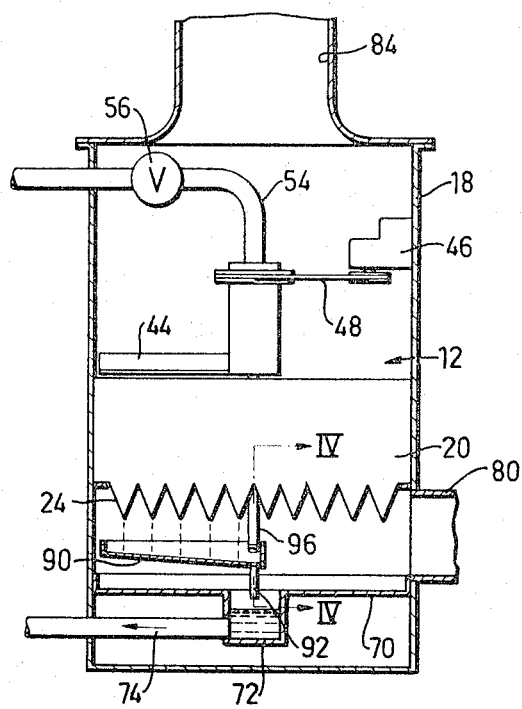
Figure 4:
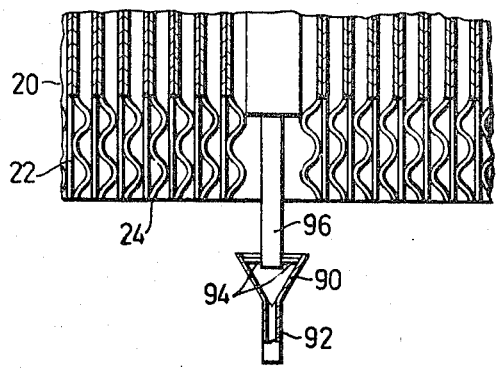

Further objects and advantages of the invention will become apparent from the following description considered in connection with the accompanying drawings which form part of this specification, and of which:

FIG. 1 is a sectional view of an air conditioning apparatus constructed according to the invention;
FIG. 2 is a partial sectional view following line II—II of FIG. 1 on a larger scale;
FIG. 3 is a sectional view of a portion of an apparatus according to a modified embodiment; and
FIG. 4 is a partial sectional view following lines IV—IV of FIG. 3 on a larger scale.

The apparatus shown in FIGS. 1 and 2 is composed of two major parts, namely a drying section and a regenerating section generally designated by 10 and 12, respectively. The drying section is provided with a casing 14 wherein a contact body 16 is mounted. The generating section also comprises a casing 18 containing a contact body 20. The two contact bodies may be similarly constructed with sheets 22 (FIG. 2) substantially parallel to one another and arranged in such a way that vertical narrow through-channels are formed between the sheets, which channels are laterally separated from one another. The sheets, or at least every second sheet, are undulated or corrugated and interconnected at the contact points along the ridges of the corrugations. Preferably the sheet material is of a liquid or water absorbing nature and has at the same time a good wet strength. The sheets may consist of paper, such as cellulose paper or asbestos paper, impregnated with a suitable synthetic resin, such as phenolic resin or an inorganic substance insoluble in water. Asbestos paper is primarily used in the contact body 20 which is exposed to a high temperature. It may also consist of a synthetic plastic material such as polyvinyl chloride. Further the channels formed in the sheets may be so narrow that the water passing the contact body may bridge over the channels at their lower part, and in order to eliminate the effect of the surface tension the sheets have been provided with drainage tips 24 in this area. For a more detailed description of the contact body reference is made to the specification of the Patent No. 2,809,818 granted October 15, 1957, to Carl Georg Munters, and the co-pending patent application Serial No. 747,431, filed July 9, 1958, now abandoned.

Below the contact body 16 the casing 14 is open so as to permit ambient air to enter into the channels of the contact body. The motion of the air is caused by a fan 28 driven by a motor 26, which fan is located in an exhaust duct 30 on the top side of the casing. On top of the contact body a sprayer 32 is mounted which is supplied with an absorptive solution by a conduit 34. The sprayer has arms 36 provided with discharge apertures 38. At the same time as this liquid is distributed evenly across the front area of the contact body, it passes down into the channels and flows along the sheets as a thin film. During its passage downwards the liquid meets the upwardly flowing air in counter-current. The liquid after having left the contact body 16 is collected by a tray 40 and a central basin 42.

The casing 18 of the regenerator section houses the contact body 20, and a sprayer arm 44 which is positively driven by a motor 46 by means of transmission 48. The speed of rotation is slow, such as 5 to 10 or 20 r.p.h. The arm 44 has apertures 50 in its bottom face. Further, the arm carries on either side baffles 52 closely engaging the top surface of the contact body 20.

The sprayer 44 is supplied with absorptive solution through a conduit 54 in which a control valve 56 may be mounted. From the container or basin 42 the liquid is conducted through a conduit 58 to a conduit 62, in which a control valve 60 may be mounted and which is connected to the conduit 34 so that a closed circuit through the section 10 of the apparatus is obtained. At the same time a part of this liquid passes through the conduit 54 to the sprayer 44 in the section 12 of the apparatus. In the conduit 34 there may be mounted, a heat exchanger 64 in which a cooling medium, such as cooling tower water, is caused to circulate by way of conduits 66 and 68. However, since the liquid is not heated to any substantial degree, as will be understood from the following, the heat exchanger may be eliminated.

The absorptive solution passing through the contact body 20 in the apparatus section 12 is collected by a tray 70 with a central basin 72 which connects to conduits 58 and 62 by way of the conduit 74. In the conduit 62 a pump 76 is mounted whose suction end is located below the basins 42 and 72 and therefore receives liquid from both basins.

A gas flow is supplied to the base face of the contact body in the apparatus section 12 by means of a fan 78 and a conduit 80. Disposed in the latter is a heating device 82, for example a gas burner. The gas flow is heated to a temperature of 100° C. or more and passes upwardly through the channels of the contact body 20. The gas flow escapes through an upper duct 84 which preferably is connected to the suction end of the fan 78 so that the regenerating flow forms a closed circuit 85. A regenerative system of this kind is disclosed in Patents Nos. 2,993,563, dated July 25, 1961 and 2,957,321, dated October 25, 1960, to which reference is made for more detailed description. Fresh air is introduced through a conduit 86 into the circulating mass of gas in the minimum quantity required for keeping up the combustion in the gas burner 82. Draining of the corresponding quantity of the gas mass may be performed through a tapping connection 88 from the circuit 85.

The device operates in the following manner:

The air to be dried is supplied to the contact body 16 in the drying section 10 and passes upwards through the channels of the latter, during which passage it is brought into contact with an absorptive solution supplied from the top by the sprayer 32. The absorptive solution is spread out as a thin film across the several sheets of the contact body and absorbs moisture from the air, which then escapes through the upper exhaust duct 30. The absorptive solution, which preferably consists of water and a lithium salt as already stated hereinbefore, is enriched in water by its absorptive action. To have its absorptive capacity restored, the solution must be regenerated. This regeneration is effected in the apparatus section 12 by a part of the solution circulating through conduits 58 and 62 passing through the conduit 54 to the sprayer 44. The amount of solution shunted through the conduit 54 is comparatively abundant so that it will properly flush the sheets in the contact body 20 when the sheets arrive opposite to the lower discharge apertures 50 of the sprayer. The portion of the contact body momentarily wetted by the absorptive solution is shut off from the hot regenerating air flow by the narrow gaps between the sprayer 44 and the baffles 52 and the contact body. On the other hand this hot air flow affects the major portion of the contact body sheets which are positioned laterally of the sprayer during the slow rotation of the latter. The absorptive solution soaked up into the sheets is thus subjected to a strong drying action and an evaporation takes place which may be conducted without any inconveniences until the salt precipitates in solid state on the sheets. As the major portion of the liquid supplied through the sprayer arm 44 has managed to flow off before the hot air flow comes into contact with the sheets, the quantity of solution heated in this way is minimized.

When the arm 44 then passes once more across a portion of the sheets these will be flushed with such a large amount of liquid that the evaporated solution is washed along and any salt crystals are dissolved. The heat losses will become small as they are limited to the heat content of the contact body and that of the small quantity of liquid heated by the regenerating flow. The liquid collected in the lower part of the apparatus section, which liquid for its major part has not been into contact with the hot regenerating flow, has been enriched in its salt content when it enters the circuit of the drying section 10. Thus it mixes with the solution drained from the drying section 10 through the conduit 58 which solution obtains an increased salt concentration. From the conduit 62 the major part of the liquid passes through the conduit 34 back to the sprayer 32 of the apparatus section 10, while a minor part is conducted to the sprayer 44 in the apparatus section 12.

The embodiment shown in the FIGS. 3 and 4, wherein the same reference characters have been used as in FIGS. 1 and 2 for equivalent parts, is suitably combined with a drying section 10 of the type shown in said last-named figures. According to FIGS. 3 and 4 a collecting gutter 90 is disposed under the sprayer 44 in such a way that it picks up the liquid flushing through the contact body, said liquid then being diverted to the central basin 72 through a pipe 92. The gutter 90 is rigidly secured, e.g. by small spokes 94, to a shaft 96 rotating together with the sprayer 44. By this device the contact between the rinsing liquid and the regenerating gas flow will be still less than in the preceding embodiment.

As an alternative the contact bodies 16 and 20 may be rotatable while the sprayer is stationary. If desired the two contact bodies may be combined into a unit having different sectors for drying the air and regenerating the absorption liquid. By using a sprayer device of the type used in the apparatus section 12 also in the apparatus section 10 it is possible to prevent in said latter section drops of the absorption liquid from becoming entrained by the air stream flowing upwards. The advantage of this arrangement is that the apparatus section 10 need not be equipped with a separator member for the absorption liquid. The contact body may be of some other type than that described above, and it may e.g. be composed of filamentary material. Instead of or in combination with the baffles 52, baffles may be arranged on the lower face of the contact body 20 for blocking the channels to the gas flow when the absorption liquid is flowing through said channels.

While several more or less specific embodiments of the invention have been shown and described, it is to be understood that this is for the purpose of illustration only, and that the invention is not to be limited thereby, but its scope is to be determined by the appended claims.

What I claim is:

1. The method of regenerating the hygroscopic properties of a diluted liquid stream employed as desiccant in a system of absorbing moisture from a gas, in which system a primary stream of a liquid solution containing a hygroscopic component is circulated in cooperative contact with the gas to desiccate the latter, said system containing an absorptive element having extended surfaces upon which said stream is directed, said method comprising diverting a portion of said primary stream circulating in said system to form a secondary stream, delivering said secondary stream to said absorptive element, a first small portion of said stream being deposited as an adherent film on said surfaces, passing a heated gas stream through said deposited first small portion of said secondary stream to evaporate liquid therefrom and concentrate said hygroscopic component, flushing successive, restricted portions of said adherent film of said first small portion of said secondary stream with a continuously flowing large portion of said secondary stream to remove deposits of said concentrated hygroscopic component, said flushing action leaving a fresh deposit as said adherent film which is not gas swept during said flushing, and returning the said large portion of said secondary stream with the flushed deposited and concentrated hygroscopic component to the main stream.

2. In an apparatus for regenerating the hygroscopic properties of a diluted liquid stream employed as a desiccant in a system of absorbing moisture from a gas, in which system a primary stream of a liquid solution containing a hygroscopic component is circulated in cooperative contact with the gas to desiccate the latter, said system containing an absorptive element having extended surfaces upon which said stream is directed, the improvement comprising means for diverting a portion of said primary stream circulating in said system to form a secondary stream and for delivering said secondary stream to a regenerating unit, which unit contains said absorptive element, means in said regenerating unit both for depositing a first small portion of said secondary stream as an adherent film on said surfaces and for flushing successive restricted portions of said absorptive element with a continuous flow of the remaining large portion of said secondary stream, means for directing a heated gas stream through the portion of said absorptive element not being flushed by said continuous flow of said remaining large portion of said secondary stream, said heated gas stream evaporating liquid from said adherent film to concentrate and deposit said hygroscopic component on said absorptive element and said continuous flow of said remaining large portion of said secondary stream through restricted portions of said element flushing deposits of said hygroscopic component from said absorptive element, and means for returning said remaining large portion of said secondary stream with its flushed deposit to said primary stream.

References Cited by the Examiner
UNITED STATES PATENTS

| | | |
|---|---|---|
| 1,661,489 | 3/1928 | Meynardie. |
| 2,221,787 | 11/1940 | Downs et al. _____ 159—4 X |
| 2,367,695 | 1/1945 | Spiselman. |
| 2,662,759 | 12/1953 | Brewer _____ 261—112 X |
| 2,809,818 | 10/1957 | Munters _____ 261—24 |
| 2,876,833 | 3/1959 | Kelley et al. _____ 159—4 X |
| 3,099,696 | 7/1963 | Meek _____ 261—24 |
| 3,101,383 | 8/1963 | Paris _____ 261—24 |

NORMAN YUDKOFF, *Primary Examiner.*

J. SOFER, *Assistant Examiner.*